(12) United States Patent
Anderson et al.

(10) Patent No.: US 12,504,495 B2
(45) Date of Patent: Dec. 23, 2025

(54) RYDBERG-MOLECULE-BASED MICROWAVE DIRECTION FINDING

(71) Applicant: ColdQuanta, Inc., Boulder, CO (US)

(72) Inventors: Dana Zachary Anderson, Boulder, CO (US); Haoquan Fan, Erie, CO (US); Ying-Ju Wang, Broomfield, CO (US); Eric Magnuson Bottomley, Broomfield, CO (US)

(73) Assignee: ColdQuanta, Inc., Boulder, CO (US)

( * ) Notice: Subject to any disclaimer, the term of this patent is extended or adjusted under 35 U.S.C. 154(b) by 0 days.

(21) Appl. No.: 18/636,077

(22) Filed: Apr. 15, 2024

(65) Prior Publication Data

US 2024/0272262 A1    Aug. 15, 2024

Related U.S. Application Data

(63) Continuation of application No. 17/021,033, filed on Sep. 15, 2020, now Pat. No. 11,988,759.

(60) Provisional application No. 63/048,302, filed on Jul. 6, 2020.

(51) Int. Cl.
G01S 3/46    (2006.01)
(52) U.S. Cl.
CPC ................................. *G01S 3/46* (2013.01)
(58) Field of Classification Search
None
See application file for complete search history.

(56) References Cited

U.S. PATENT DOCUMENTS

| | | | |
|---|---|---|---|
| 4,024,396 A | 5/1977 | Hill |
| 4,297,704 A | 10/1981 | Marom |
| 4,326,778 A | 4/1982 | Berg |
| 4,766,439 A | 8/1988 | Misek |
| 4,888,593 A | 12/1989 | Friedman |
| 5,682,238 A | 10/1997 | Levitt |

(Continued)

FOREIGN PATENT DOCUMENTS

| | | |
|---|---|---|
| AU | 2021306994 | 2/2023 |
| WO | 2022010719 | 1/2022 |

OTHER PUBLICATIONS

Holloway et al., Broadband Rydberg Atom Based Self-Calibrating RF E-Field Probe, National Institute of Standards and Technology (NIST), Electromagnetics Division, 3 pages.

(Continued)

*Primary Examiner* — Whitney Moore
(74) *Attorney, Agent, or Firm* — Schwegman Lundberg & Woessner, P.A.

(57) ABSTRACT

A probe laser beam causes molecules to transition from a ground state to an excited state. A control laser beam causes molecules in the excited state to transition to a laser-induced Rydberg state. Microwave lenses convert a microwave wavefront into respective microwave beams. The microwave beams are counter-propagated through molecules so as to create a microwave interference pattern of alternating maxima and minima. The microwave interference pattern is imposed on the probe beam as a probe transmission pattern. The propagation direction of the microwave wavefront can be determined from the translational position of the probe transmission pattern; the intensity of the microwave wavefront can be determined by the intensity difference between the minima and maxima of the probe transmission pattern.

20 Claims, 4 Drawing Sheets

(56) References Cited

U.S. PATENT DOCUMENTS

| | | | |
|---|---|---|---|
| 6,188,481 | B1 | 2/2001 | Kumar |
| 6,285,493 | B1 | 9/2001 | Carrott |
| 6,639,552 | B2 | 10/2003 | Carrott |
| 8,884,820 | B2 | 11/2014 | Poisel |
| 10,979,147 | B2 | 4/2021 | Gordon |
| 11,165,505 | B2 | 11/2021 | Gordon |
| 11,988,759 | B2 | 5/2024 | Anderson et al. |
| 2003/0129117 | A1 | 7/2003 | Mills |
| 2015/0070217 | A1 | 3/2015 | Sharawi |
| 2016/0363617 | A1 | 12/2016 | Anderson |
| 2017/0370979 | A1 | 12/2017 | Braje |
| 2018/0031620 | A1 | 2/2018 | Anderson et al. |
| 2018/0074600 | A1 | 3/2018 | Park |
| 2018/0373118 | A1 | 12/2018 | Kiffner |
| 2019/0187198 | A1 | 6/2019 | Anderson |
| 2020/0136727 | A1 | 4/2020 | Graceffo |
| 2020/0233025 | A1 | 7/2020 | Salim |
| 2020/0292606 | A1 | 9/2020 | Holloway |
| 2021/0270882 | A1 | 9/2021 | Imhof |
| 2022/0003829 | A1 | 1/2022 | Anderson et al. |
| 2022/0196716 | A1 | 6/2022 | Anderson |
| 2022/0390496 | A1* | 12/2022 | Aksyuk .............. G01R 29/0892 |

OTHER PUBLICATIONS

Ripka et al., Rydberg atom-based radio frequency: hyperfine effects, Proc. SPIE 12016, Optical and Quantum Sensing and Precision Metrology II, 1201601, Mar. 2, 2022, 7 pages.

Ghosh et al., "Demonstration of a high-contrast optical switching in an atomic delta system." Journal of Physics B: Atomic, Molecular and Optical Physics 50.16 (2017): 165502. (Year: 2017).

Joshi et al., "Controlling nonlinear optical processes in multi-level atomic systems." Progress in Optics 49 (2006).

"U.S. Appl. No. 17/021,033, Non Final Office Action mailed Jul. 19, 2023", 14 pgs.

"U.S. Appl. No. 17/021,033, Response filed Oct. 13, 2023 to Non Final Office Action mailed Jul. 19, 2023", 11 pgs.

"U.S. Appl. No. 17/021,033, Final Office Action mailed Oct. 31, 2023", 19 pgs.

"U.S. Appl. No. 17/021,033, Response filed Dec. 8, 2023 to Final Office Action mailed Oct. 31, 2023", 9 pgs.

"U.S. Appl. No. 17/021,033, Examiner Interview Summary mailed Dec. 12, 2023", 2 pgs.

"U.S. Appl. No. 17/021,033, Notice of Allowance mailed Jan. 24, 2024", 8 pgs.

"U.S. Appl. No. 17/021,033, Corrected Notice of Allowability mailed Mar. 1, 2024", 2 pgs.

"U.S. Appl. No. 17/021,033, Corrected Notice of Allowability mailed Apr. 22, 2024", 2 pgs.

"International Application Serial No. PCT US2021 039990, International Search Report mailed Oct. 19, 2021", 2 pgs.

"International Application Serial No. PCT US2021 039990, Written Opinion mailed Oct. 19, 2021", 5 pgs.

"International Application Serial No. PCT US2021 039990, International Preliminary Report on Patentability mailed Jan. 19, 2023", 7 pgs.

"European Application Serial No. 21838349.5, Extended European Search Report mailed Jul. 22, 2024", 7 pgs.

"Australian Application Serial No. 2021306994, First Examination Report mailed Sep. 25, 2023", 4 pgs.

"Australian Application Serial No. 2021306994, Response filed Dec. 13, 2023 to First Examination Report mailed Sep. 25, 2023", 38 pgs.

Barber, "Angle of arrival estimation using spectral interferometry", Journal of Luminescence, vol. 130, No. 9, (Sep. 1, 2010), pp. 1614-1618.

Kumar, Santosh, "Rydberg-atom based radio-frequency electrometry using frequency modulation spectroscopy in room temperature vapor cells", arxiv.org, Cornell University Library, 201 Olin Library Cornell University Ithaca, NY 14853, (Feb. 2, 2017), 13 pages.

Anderson et al., Rydberg atoms for radio-frequency communications and sensing: atomic receivers for pulsed RF field and phase detection, Rydberg Technologies Inc., Ann Arbor, MI 48103 USA; Oct. 18, 2019, 10 pages.

Berweger et al., Rydberg state engineering: A comparison of tuning schemes for continuous frequency sensing, Sep. 28, 2022; 11 pages.

Berweger et al., Rydberg-State Engineering: Investigations of Tuning Schemes for Continuous Frequency Sensing, Physical Review Applied 19, 044049, 13 pages, Apr. 18, 2023.

Bohaichuk et al., The Origins of Rydberg Atom Electrometer Transient Response and its Impact on Radio Frequency Pulse Sensing, Quantum Valley Ideas Laboratories, Sep. 13, 2022, 20 pages.

Cai et al., Sensitivity improvement of Rydberg atom-based microwave sensing via electromagnetically induced transparency, Nov. 15, 2021, 8 pages.

Carr et al., Three-photon electromagnetically induced transparency using Rydberg states, Optics Letters / vol. 37, No. 18, Sep. 15, 2012, 3 pages.

Carter et al., Electric field sensing near the surface microstructure of an atom chip using cold Rydberg atoms, Department of Physics and Astronomy and Institute for Quantum Computing, University of Waterloo, Dec. 21, 2013, 7 pages.

Daschner et al., Triple stack glass-to-glass anodic bonding for optogalvanic spectroscopy cells with electrical feedthroughs, Physikalisches Institut, Mar. 5, 2014, 4 pages.

David Henry Meyer, Magnetic & Electric Field Sensing and Applications Based on Coherent Effects in Neutral Atoms, 2018, 265 pages.

Fan et al., "Effect of Vapor-Cell Geometry on Rydberg-Atom-Based Measurements of Radio-Frequency Electric Fields." American Physical Society, 2015., pp. 044015-1 through 044015-7 (2015).

Fan et al., Atom Based RF Electric Field Sensing, Journal of Physics B: Atomic, Molecular and Optical Physics, Topical Review, published Sep. 9, 2015, pp. 1-16.

Fan et al., Sub-wavelength microwave electric field imaging using Rydberg atoms inside atomic vapor cells, Homer L. Dodge Department of Physics and Astronomy, The University of Oklahoma, Mar. 14, 2014, 5 pages.

Grabowski et al., High Resolution Rydberg Spectroscopy of ultracold Rubidium Atoms, Aug. 25, 2016, 9 pages.

Holloway et al., "Atom-Based RF Electric Field Metrology: From Self-Calibrated Measurements to Subwavelength and Near-Field Imaging". IEEE Transactions on Electromagnetic Compatibility, vol. 59, No. 2, Apr. 2017. pp 717-728. (Year: 2017).

Holloway et al., Broadband Rydberg Atom Based Self-Calibrating RF E-Field Probe, National Institute of Standards and Technology (NIST), Electromagnetics Division, 3 pages, Aug. 16, 2014.

Holloway et al., Broadband Rydberg Atom-Based Electric-Field Probe: From Self-Calibrated Measurements to Sub-Wavelength Imaging, National Institute of Standards and Technology (NIST), U.S. Department of Commerce, Boulder Laboratories, May 27, 2014, 12 pages.

Holloway et al., Electric field metrology for SI traceability: Systematic measurement uncertainties in electromagnetically induced transparency in atomic vapor, Journal of Applied Physics 121, 233106; doi: 10.1063/1.4984201, 2017, 10 pages.

Holloway et al., Electromagnetically induced transparency based Rydberg-atom sensor for quantum voltage measurements, Oct. 26, 2021, 13 pages.

Hu et al., Continuously tunable radio frequency electrometry with Rydberg atoms, Appl. Phys. Lett. 121, 014002; https://doi.org/10.1063/5.0086357, Jul. 7, 2022, 7 pages.

Jason Owen Day. Progress Towards the Creation of an On-Demand Single Photon Source Using Rydberg Atoms. Diss. University of Wisconsin—Madison, 2008. (Year: 2008).

Kilian Talo Theodor Singer, Interactions in an ultracold gas of Rydberg atoms, Oct. 2004, 133 pages.

Lauren Levac. Observation of the Dipole-dipole Interaction in Dressed State Rydberg Atoms by Microwave Spectroscopy. Diss. University of Virginia, 2013. (Year: 2013).

(56) References Cited

OTHER PUBLICATIONS

Mao et al., A high-efficiency fiber-coupled Rydberg-atom integrated probe and its imaging applications, IEEE Antennas and Wireless Propagation Letters, 2022, 5 pages.
Meyer et al., Optimal Atomic Quantum Sensing using EIT Readout, Aug. 9, 2021, 12 pages.
Otto et al., Data capacity scaling of a distributed Rydberg atomic receiver array, Department of Physics, QSO—Centre for Quantum Science, and Dodd-Walls Centre, University of Otago, Dunedin, New Zealand, Apr. 8, 2021, 10 pages.
Prajapati et al., Enhancement of electromagnetically induced transparency based Rydberg-atom electrometry through population repumping, Aug. 31, 2021, 5 pages.
Prajapati et al., TV and Video Game Streaming with a Quantum Receiver: A Study on a Rydberg atom-based receiver's bandwidth and reception clarity, National Institute of Standards and Technology, May 13, 2022, 6 pages.
Renate Daschner, Addressable Rubidium vapor cells for optical and electrical read-out of Rydberg excitations, 2015, 195 pages.
Ripka et al., Rydberg atom-based radio frequency: hyperfine effects, Proc. SPIE 12016, Optical and Quantum Sensing and Precision Metrology II, 120160I, Mar. 2, 2022, 7 pages.
Robinson et al. "Determining the angle-of-arrival of a radio-frequency source with a Rydberg atom-based sensor." Appl. Phys. Lett. Mar. 15, 2021; 118 (11): 114001. (Year: 2021).
Simons et al. "Applications with a Rydberg Atom-Based Radio Frequency Antenna/Receiver." Proc. of the 2019 International Symposium on Electromagnetic Compatibility (EMC Europe 2019). Sep. 2-6, 2019. pp. 885-889. (Year: 2019).
Simons et al., "A Rydberg Atom-Based Mixer: Measuring the Phase of a Radio Frequency Wave". Applied Physics Letters 114, 114101 (2019). 5 pages. (Year: 2019).
Simons et al., "Embedding a Rydberg Atom-Based Sensor into an Antenna for Phase and Amplitude Detection of Radio-Frequency Fields and Modulated Signals", in IEEE Access, vol. 7, pp. 164975-164985, 2019, doi: 10.1109/ACCESS.2019.2949017. (Year: 2019).
Simons et al., Continuous radio frequency electric-field detection through adjacent Rydberg resonance tuning, Oct. 9, 2021, 9 pages.
Simons et al., Using frequency detuning to improve the sensitivity of electric field measurements via electromagnetically induced transparency and Autler-Townes splitting in Rydberg atoms, Applied Physics Letters 108, 174101; doi: 10.1063/1.4947231, 2016, 6 pages.
Teale et al., Degenerate two-photon Rydberg atom voltage reference, AVS Quantum Sci. 4, 024403; https://doi.org/10.1116/5.0090892, Jun. 15, 2022, 6 pages.
Thaicharoen et al., Electromagnetically-induced transparency, absorption, and microwave field sensing in a Rb vapor cell with a three-color all-infrared laser system, May 27, 2019, 9 pages.
Van Ditzhuijzen et al., Simultaneous position and state measurement of Rydberg atoms, Eur. Phys. J. D 40, 13-17. DOI: 10.1140/epjd/e2006-00140-1, Jun. 21, 2006, 6 pages.
You et al., Microwave-field sensing via electromagnetically induced absorption of Rb irradiated by three-color infrared lasers, vol. 30, No. 10, Optics Express, May 9, 2022, 11 pages.

\* cited by examiner ents of page RYDBERG-MOLECULE-BASED MICROWAVE DIRECTION FINDING

CROSS REFERENCE TO OTHER APPLICATIONS

[This application is a continuation of U.S. patent application Ser. No. 17/021,033 entitled RYDBERG-MOLECULE-BASED MICROWAVE DIRECTION FINDING filed Sep. 15, 2020, which claims priority to U.S. Patent Provisional Application No. 63/048,302 entitled RYDBERG-ATOM-BASED MICROWAVE DIRECTION FINDING filed Jul. 6, 2020, both of which are incorporated herein by reference for all purposes.

BACKGROUND

Microwaves have many applications including those in point-to-point communication links, satellite and spacecraft communications, remote sensing, radio astronomy, radar, and medical imaging. "Microwave", as broadly defined herein, encompasses electromagnetic radiation of wavelengths of one meter (corresponding to a frequency of 300 megahertz (MHz)) down to 100 micrometers (corresponding to a frequency of three terahertz (THz)); in other words, "microwave", as defined herein, encompasses ultra-high frequency (UHF), super high frequency (SHF), extremely high frequency (EHF), also known as "millimeter wave", and tremendously high frequency (THF) frequency ranges defined by the International Telecommunications Union (ITU).

In many microwave applications, it can be important to determine the propagation direction and electric-field strength of a received microwave wavefront. Herein, "microwave wavefront" refers to a propagating microwave field or field component that can be characterized by a combination of 1) a propagation direction that corresponds to the orientation of the wavefront; and 2) an electric-field intensity that corresponds to the intensity of the wavefront. If the microwave wavefront is information-bearing, then it qualifies as a microwave signal. For example, characterizing the direction and strength of an information-bearing microwave signal can be used to locate its transmitter, e.g., to orient a receiver's antenna or for geolocation purposes. While microwave sensors have been realized using a variety of technologies, performance has been limited by a lack of sensitivity. What is needed is an approach to microwave sensing that provides for greater sensitivity in direction and intensity measurements.

DETAILED DESCRIPTION

The present invention provides a Rydberg-molecule-based microwave direction finder (MDF) that employs passive correlative interferometry to achieve high sensitivity, high angular resolution, wide tuning bandwidth, and in band and out-of-band selective filtering. Herein, "molecule" refers to the smallest particle of a substance that retains all the properties of the substance and is composed of one or more atoms; this definition, which is set forth in the *Merriam Webster Dictionary*, encompasses monatomic (single-atom) molecules as well as polyatomic molecules. Thus, gas-phase alkali (e.g., potassium, rubidium, and cesium) atoms qualify as molecules under this definition. Not used herein is an alternative and more restrictive definition set forth in the *IUPAC Gold Book*: "An electrically neutral entity consisting of more than one atom".

A probe laser causes molecules in a ground state to transition to an excited state, and a control laser causes molecules in the excited state to transition to a laser-induced Rydberg state. Microwave lenses convert a microwave wavefront into respective microwave beams. The microwave beams are counter-propagated through the molecules so that they interfere to establish a microwave interference pattern of alternating maximum and minimum microwave intensity. In the case that the microwave wavefront has the right frequency to cause molecules to transition from the laser-induced Rydberg state to a microwave-induced Rydberg state, the microwave interference pattern results in a corresponding probe transmission pattern, which can be captured by a camera. The position of the probe transmission pattern indicates the direction of the received microwave wavefront, while the minimum and maximum probe transmission intensities can be used to determine the microwave wavefront intensity.

Relative to direction finding systems that use antennas to convert incoming microwaves to electric signals on which the direction determinations are based, the Rydberg-molecule-based MDF provides: (1) high sensitivity; (2) selective in- and out-of-band filtering (due to the narrow bandwidth associated with Rydberg-Rydberg transitions); (3) high angular resolution; and (4) very wide microwave tuning bandwidth. Embodiments provide a frequency range of ~1-1000 GHz, including between 10 GHz and 100 GHz, e.g., for engagement and fire control radar.

Figure 1:
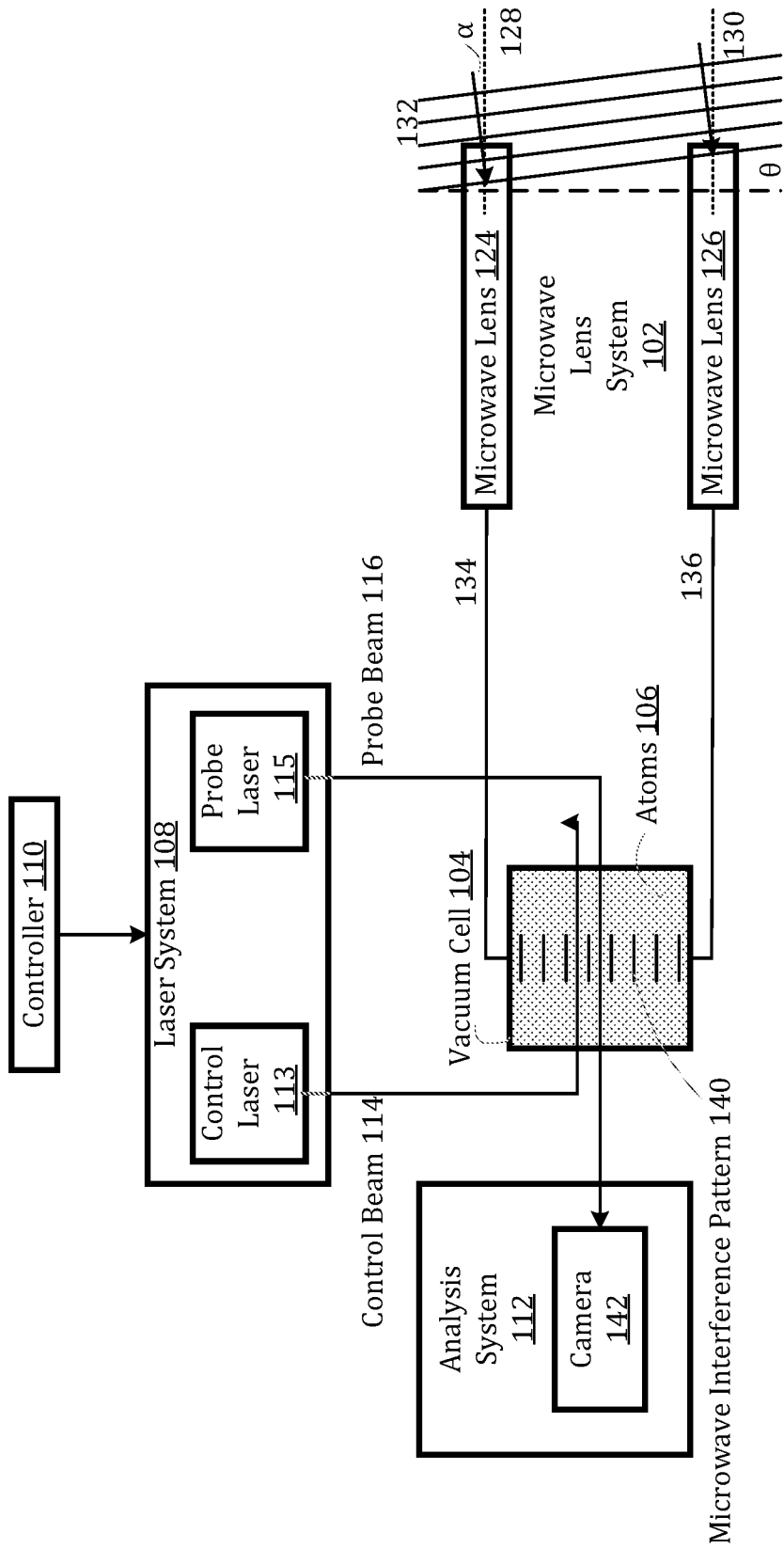
FIG. 1 is a schematic diagram of a Rydberg-atom-based microwave direction finder.

As shown in FIG. 1, an MDF 100 includes a microwave lens system 102, an ultra-high vacuum (UHV) cell 104 containing atoms 106, a laser system 108, a controller 110, and an analysis system 112. Alternative embodiments use polyatomic molecules instead of atoms. A control laser 113 of laser system 108 outputs a control beam 114 and a probe laser 115 of laser system 108 outputs a probe beam 116. Control beam 114, which may also be referred to as a "pump" beam or a "coupling" beam, can be tuned to select different microwave frequencies to which direction finding is applied. Probe beam 116 is used to capture an image of an interference pattern associated with the selected microwave frequency.

Figure 2:
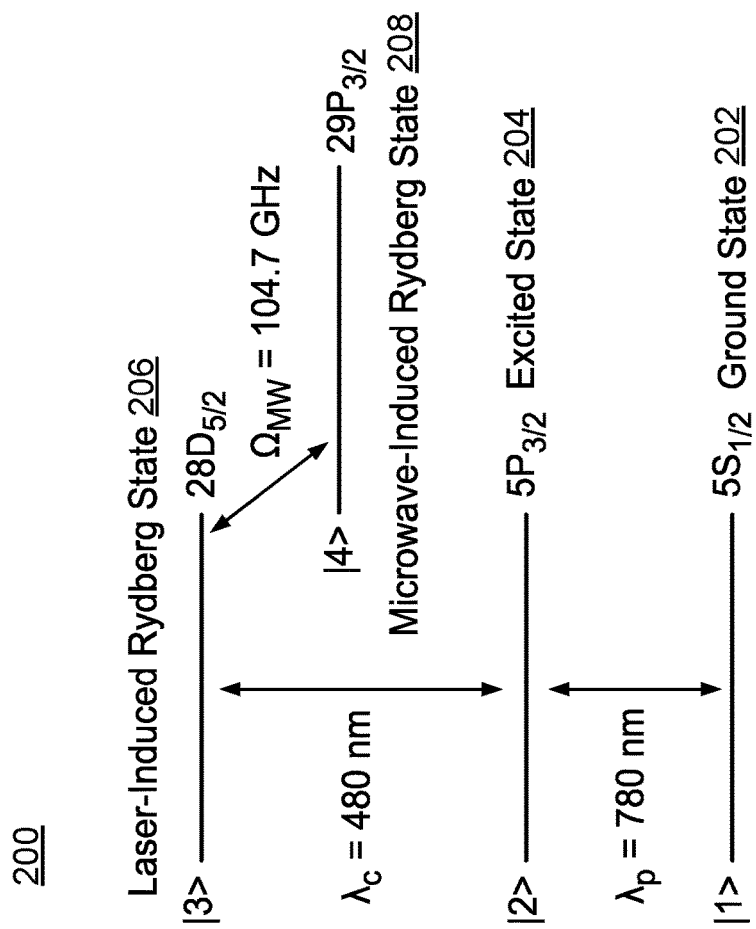
FIG. 2 is a diagram of atom excitation levels applicable to the microwave direction finder of FIG. 1.

Laser system 108 directs beams 114 and 116 through vacuum cell 104, which maintains atoms 106 at a pressure below $10^{-9}$ Torr. Probe beam 116 causes atoms in a ground state to transition to an excited state. As shown in diagram 200 of FIG. 2, a probe beam with a wavelength $\lambda_p = 780$ nanometers (nm) causes a rubidium 87 atom to transition from a ground state |1⟩ $5S_{1/2}$ 202 to an excited state |2⟩ of $5P_{3/2}$ 204. The transitions to the excited state are associated with absorption of the probe beam, resulting in an absorption peak (or transmission valley) in the spectrum of the probe beam as it exits atoms 106 (FIG. 1).

Control beam 114 (FIG. 1) causes atoms in the excited state 204 (FIG. 2) to transition to a laser-induced Rydberg state 206. A control beam with a wavelength $\lambda_c$=480 nm causes atoms in excited state |2⟩ 204 to transition to laser-induced Rydberg state |3⟩ of $28D_{5/2}$ 206. Microwave radiation with a frequency $\Omega_{MW}$=104.7 gigahertz (GHz) causes atoms in laser-induced Rydberg state 206 to transition to a microwave-induced Rydberg state |4⟩ $29P_{3/2}$ 208. This transition to the laser-induced Rydberg state is associated with a phenomenon known as "electromagnetically induced transparency", abbreviated "EIT", which is expressed as a transmission peak in the spectrum probe beam as it exits atoms 106 (FIG. 1). To perform direction finding for a different microwave frequency, a different control wavelength can be used to select a different laser-induced Rydberg state, which can have a different microwave-induced Rydberg state associated with the desired different microwave frequency.

As shown in FIG. 1, microwave lens system 102 includes microwave lenses 124 and 126 with respective optical axes 128 and 130, which are arranged parallel to each other. In an alternative embodiment, the microwave lens system includes more than two microwave lenses. A wavefront with a propagation direction parallel to optical axes 128 and 130 arrives at microwave lenses 114 and 116 at the same time. In an alternative embodiment, a wavefront with a propagation direction parallel to the respective optical axes arrives at the microwave lenses at different times. A wavefront 132 arriving at an angle α with respect to optical axes 128 and 130 arrives at microwave lenses 124 and 126 at different times, resulting in a phase difference θ corresponding to the propagation direction as represented by angle α.

Microwave lenses 124 and 126 convert an incoming microwave wavefront 132 to respective microwave beams 134 and 136. Microwave lens system 102 directs microwave beams 134 and 136 so that they counter-propagate (i.e., propagate in opposite directions along the same path) through atoms 106 in vacuum cell 104. The counter-propagating microwave beams 134 and 136 produce a microwave interference pattern 140 within vacuum cell 104.

Microwave interference pattern 140 comprises a spatially distributed pattern with alternating maxima (peaks) and minima (valleys) of microwave intensity. The microwave radiation causes a transition from the laser-induced Rydberg state to a microwave-induced Rydberg state. This transition results is an offset to the EIT induced by the transition from the excited state to the laser-induced Rydberg state. In other words, probe transmission intensity is negatively correlated with microwave intensity.

Figure 3:
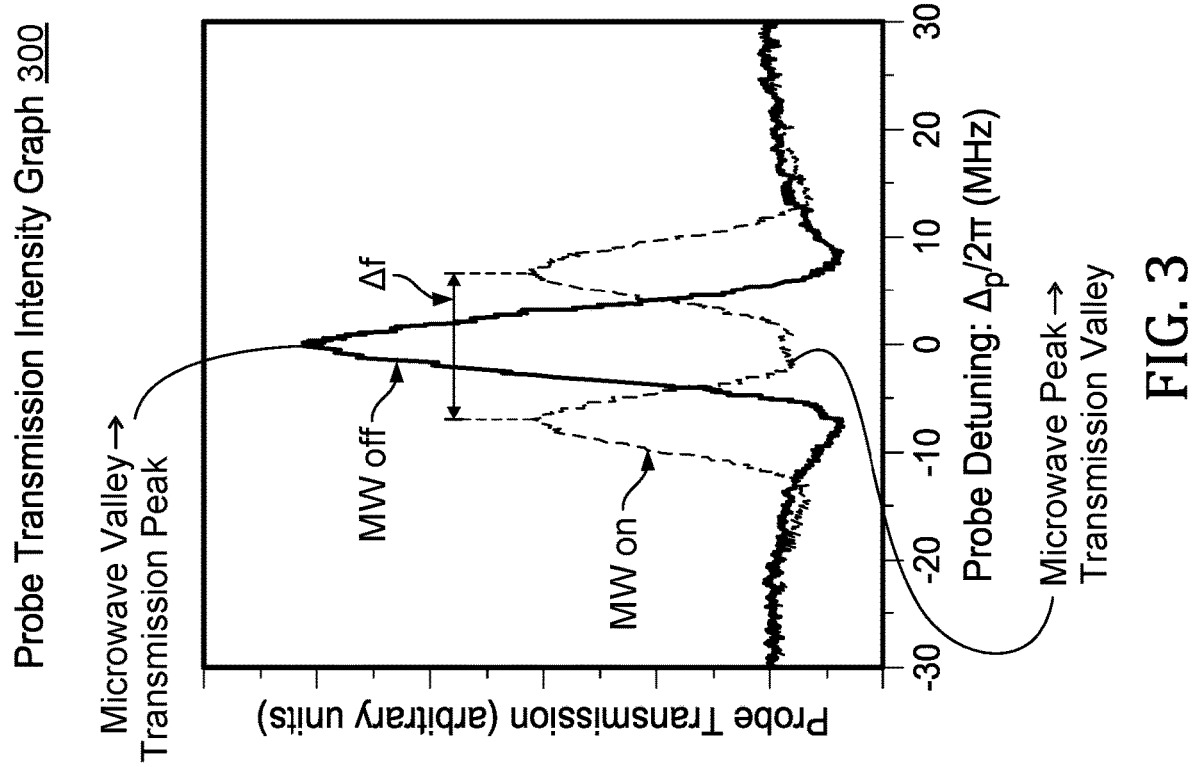
FIG. 3 is a graph of probe transmission intensity as a function of probe detuning for when the microwave radiation is ON versus OFF.

As indicated in the graph 300 of FIG. 3 and in view of this negative correlation, the microwave minima correspond to maximum transmission intensity, while the microwave maxima correspond to minimum transmission intensity at zero detuning of the probe beam. Thus, the microwave interference pattern is imposed on probe beam 116 (FIG. 1) in the form of a spatially distributed pattern with minima and maxima of transmission intensity. The probe beam transmission intensity pattern is captured by camera 142 of analysis system 112.

Figure 4:
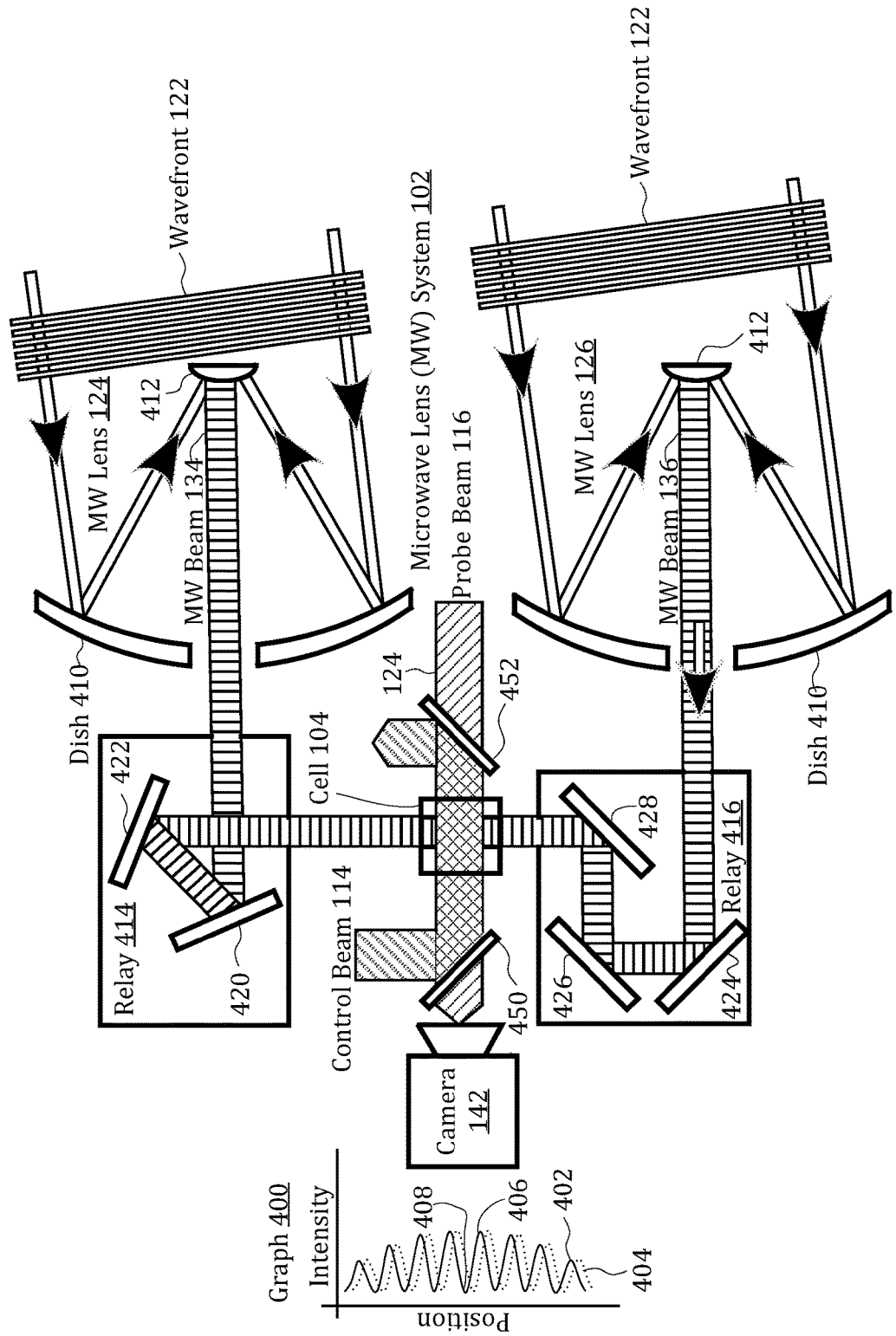
FIG. 4 is a more detailed schematic diagram of the Rydberg-atom-based microwave direction finder of FIG. 1.

The captured probe transmission intensity pattern 402 for wavefront 122 is shown in graph 400 of FIG. 4. Pattern 402 is shown displaced from a reference pattern 404 that corresponds to a probe transmission intensity pattern produced when the microwave wavefront arrives at the microwave lenses parallel to the optical axes 128 and 130 (FIG. 1) of the microwave lenses. The amount of the displacement corresponds to the angle α between the wavefront and the optical axes. Therefore, the propagation direction of the microwave wavefront 122 can be determined from the displacement of pattern 402 from reference pattern 404. The intensity of the microwave wavefront corresponds to the intensity differential between the maxima 406 and minima 408 of the captured probe transmission intensity pattern 402.

As shown in FIG. 4, microwave lenses 124 and 126 are Cassegrain lenses, each including a concave "dish" reflector 410 and a convex reflector 412. The dishes are 30 centimeters (cm) in diameter, and their optical axes are 40 cm apart. Other embodiments use different separations, e.g., between 20 and 120 cm apart, different sized dishes, e.g., between 10 and 100 cm, and/or other types of microwave lenses, e.g., phased array lenses that include separate receiving and transmitting antennas coupled to each other with spatially varying delay elements. A second pair of microwave lenses can be used to distinguish directions along an orthogonal axis, e.g., so that azimuth and altitude wavefront components can be resolved. Alternatively, one of the pair of lenses can do double duty as part of a second pair with a third lens to provide the extra dimension of direction finding.

Microwave lens system 102 also includes microwave relays 414 and 416. Microwave relay 414 includes microwave reflectors 420 and 422, which cooperate to direct microwave beam 134 into vacuum cell 104. Microwave relay 416 includes microwave reflectors 424, 426, and 428, which cooperate to direct microwave beam 136 into vacuum cell 104 so that beams 134 and 136 counter-propagate within vacuum cell 104. Generally, there is some angle dependent "walk-off" from the microwave lenses. In the illustrated configuration, walk-offs for the beam as they exit the lenses would be in opposite directions, weakening the interference pattern. By using an odd number of microwave mirrors in one relay and not the other, the walk-offs in the beams as they exit the relays are in the same direction, resulting in a stronger interference pattern and, thus, a stronger signal-to-noise ratio for the direction-finder readout.

Laser system 108 (FIG. 1) includes dichroic reflectors 450 and 452 (FIG. 2) which are used to cause probe beam 116 and control beam 114 to counter-propagate through vacuum cell 106 orthogonal to the path along which microwave beams 134 and 136 counter-propagate. Dichroic mirror 450 allows probe beam 116 to transmit straight through to camera 142 and reflects control laser beam 114. As a result, control beam 114 counter-propagates relative to probe beam 116 as it enters vacuum cell 104. Dichroic mirror 452 also allows probe beam 116 to transmit straight through, while the control laser beam 114, after passing through vacuum cell 104, is reflected out of the probe beam path and thus away from probe laser 115 (FIG. 1). In alternative embodiments, the probe and control beams can co-propagate into the cell through the same wall of the Rydberg cell, or can intersect at a right or other angle within the cell.

Laser cooling is used so that atoms 106 FIG. 1) are "cold" atoms, that is they have a temperature below one milliKelvin, e.g., closer to 300 microKelvin. Rydberg atom vapor laser cooled to 300 μK enables temperature-independent microwave detection performance, along with improved correlation signal-to-noise ratio and resolution with the elimination of Doppler effects within the technical concept. An alternative embodiment, uses higher temperature, e.g., hot or room-temperature atomic vapor cells.

Figure 5:
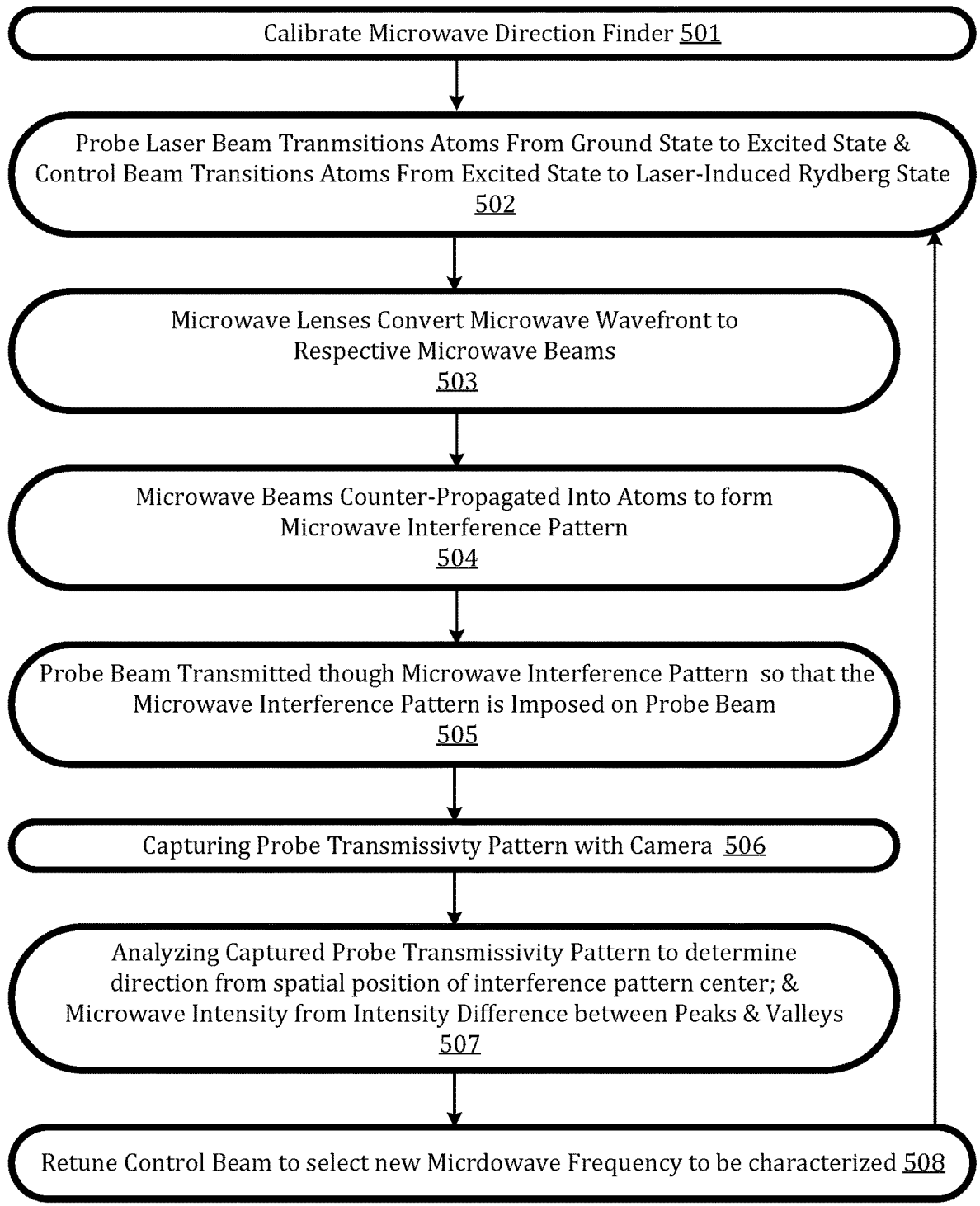
FIG. 5 is a flow chart of a microwave direction-finding process.

A microwave direction-finding process 500 is flowcharted in FIG. 5. At 501, an MDF is calibrated. For example, microwave wavefronts of known propagation direction and intensity can be directed to the microwave lenses. The displacements of the resulting probe intensity patterns relative to a reference probe intensity pattern can be determined so that displacements can be mapped to microwave propagation directions. Likewise, the known strength of each microwave wavefront can be associated with the difference in maxima and minima of the probe transmission intensity pattern so that the difference can be mapped to microwave wavefront intensity. This calibration procedure can be repeated for each of plural microwave frequencies of interest.

At 502, a probe laser beam and a control laser beam can be directed through atoms in a vacuum cell, e.g., alkali atoms or alkaline-earth atoms. The probe laser causes ground-state atoms to transition to an excited state, while the control laser causes atoms in the excited state to transition to a laser-induced Rydberg state.

At 503, microwave lenses convert a microwave wavefront into respective microwave beams. More precisely, the lenses convert microwaves of various frequencies into the beams, but typically only one of the frequencies results in a direction determination. In the illustrated embodiment, one pair of microwave lenses is used to distinguish directions that differ in the direction of separation of the optical axes of the lenses. In other embodiments, one or more additional lenses provide for a second dimension of direction finding.

At 504, the microwave beams are counter-propagated through a population of atoms, e.g., contained within a vacuum cell, resulting in a microwave interference pattern. At 505, a probe laser beam is transmitted through the atoms so that the microwave interference pattern is imposed on the probe beam to produce a pattern of high and low transmissivity for the probe beam as it exits the atoms. In general, there are multiple interference patterns corresponding to a variety of microwave frequencies, but most of these do not cause transitions from the laser-induced Rydberg state to a microwave-induced Rydberg state and, so, the corresponding microwave patterns are not imposed on the probe beam.

The maxima and minima of the microwave interference pattern correspond to regions of minima and maxima, respectively, of the probe transmission pattern. The atomic transition is sufficiently narrow that the interference pattern is always resolvable even if the signal source is broadband. The phase, or position of interference maxima as they appear on an image produced by a camera, is indicative of the incoming signal direction. Ambiguities due to the presence of antenna side lobes are resolved when needed by selecting in-band frequencies near the carrier of interest, which produces a spatial shift of the interference uniquely depending upon angle. This Rydberg detector approach simplifies considerably both signal acquisition and electronic processing of correlative interferometry.

At 506, the probe beam transmission pattern is captured, e.g., by a camera. At 507, the captured probe transmission pattern is analyzed to determine the propagation direction and intensity of the corresponding microwave wavefront. The propagation direction is determined based on the translational position of the probe transmission pattern, e.g., relative to a reference position corresponding to an on-axes microwave propagation direction. The intensity of the microwave wavefront is determined based on the intensity difference between the maxima and minima of the captured probe transmission pattern. This completes the direction (and intensity) finding for a single microwave frequency.

At 508, the control beam is tuned to change its wavelength, which in turn changes the laser-induced Rydberg state to which atoms in the excited state are transitioned. This in turn, changes which microwave-induced Rydberg states are available as transition targets, which determines which microwave frequency can be selected as a target for direction finding. In many cases, the desired target microwave frequency is selected first and the control laser wavelength is selected as a function of the desired target microwave frequency. In case a suitable control laser wavelength does not exist for a desired target microwave frequency, some embodiments allow the probe laser wavelength to be changed to provide additional Rydberg transitions from which a match for the desired target microwave frequency may be found. Once the control laser beam frequency has been retuned, process 500 iterates by returning to action 502.

The illustrated embodiment achieves the following. The MDF system has a sensitivity of −194 dBm/Hz (minimum detectable signal) with no high ambient temperature degradation. Rydberg atom transitions are practically continuous from a microwave perspective and, using a tunable laser, can achieve extremely wide band tuning of 1-1000 GHz. The instantaneous bandwidth at any transition frequency is on the order of 1 MHz with a filter response that has practically infinite rejection out of band. This bandwidth is approximately the same at 10, 30 and 100 GHz, and therefore, relative selectivity increases with increasing microwave frequency; this type of spectral selectivity has not been achievable with electronic filters.

Signals from a pair of receiving microwave lenses are correlated to provide interferometric resolution with parallel optical readout, i.e. without any active radio-frequency electronics or signal processing. Fundamental detector resolution of the proposed system is less than 0.5° at an incident power of −150 dBm (decibel milliwatts) across the spectrum 10 GHz-100 GHz. Higher angular resolution can be achieved by increasing the optical depth of the cold-atom cloud, e.g., by using a larger or more dense optical cloud. In addition, larger Cassegrain dish apertures can achieve correspondingly higher angular resolution. The angular resolution is ultimately limited the signal-to-noise ratio, which, in turn, is affected field sensitivity and a diffraction limit of the targeted microwave signal.

Herein, all art labeled "prior art", if any, is admitted prior art; all art not labelled "prior art" is not admitted prior art. The illustrated embodiments, variations thereupon, and modifications thereto are provided for by the present invention, the scope of which is defined by the following claims.

What is claimed is:

1. A microwave direction finder for finding a direction of a microwave wavefront detectable in an environment, comprising:
    a cell containing molecules capable of being laser-induced into a desired laser-induced Rydberg state;
    a laser system that induces the desired laser-induced Rydberg state in at least a portion of the molecules, the laser system including:
    a probe laser that provides a probe beam to the cell; and
    a control laser that provides a control beam to the cell, wherein the probe beam and the control beam together provide the desired laser-induced Rydberg state to the molecules;
    a microwave lens system that receives the microwave wavefront and converts the microwave wavefront into a microwave interference pattern upon the cell, the microwave interference pattern inducing a probe transmission pattern in the probe beam; and
    an analysis system that determines a propagation direction of the microwave wavefront based on the probe transmission pattern.

2. The microwave direction finder of claim 1, wherein the probe beam transitions the portion of the molecules from a first state to a second state and wherein the control beam transitions the portion of the molecules from the second state to a third state, the third state being the desired laser-induced Rydberg state.

3. The microwave direction finder of claim 1, wherein the analysis system determines the propagation direction based on a position of the probe transmission pattern in the cell.

4. The microwave direction finder of claim 1, further comprising a controller that selects a microwave frequency to which direction finding is to be applied by changing a wavelength of the control beam.

5. The microwave direction finder of claim 1, wherein the analysis system determines an intensity of the microwave wavefront based on the probe transmission pattern.

6. The microwave direction finder of claim 1, wherein the molecules are cold atoms having an associated temperature below one millikelvin.

7. The microwave direction finder of claim 1, wherein the microwave lens system includes a plurality of microwave lenses.

8. The microwave direction finder of claim 7, wherein the microwave lenses have respective optical axes that are parallel to each other.

9. A microwave direction finder, comprising:
a cell containing molecules;
a laser system that induces a Rydberg state in at least a portion of the molecules, including:
a probe laser that provides a probe beam; and
a control laser that provides a control beam to, together with the probe beam, induce the Rydberg state in the at least a portion of the molecules;
a microwave lens system that converts a microwave wavefront into a plurality of microwave beams having a phase difference such that the plurality of microwave beams form a microwave interference pattern in the cell, a position of the microwave interference pattern in the cell being based on a propagation direction of the microwave wavefront, the microwave interference pattern inducing a probe transmission pattern in the probe beam; and
an analysis system that determines the propagation direction of the microwave wavefront based on the probe transmission pattern.

10. The microwave direction finder of claim 9, wherein the probe beam transitions the portion of the molecules from a first state to a second state and wherein the control beam transitions the portion of the molecules from the second state to a laser-induced third state.

11. The microwave direction finder of claim 9, wherein the analysis system determines the propagation direction based on a position of the probe transmission pattern in the cell.

12. The microwave direction finder of claim 9, further comprising a controller that selects a microwave frequency to which direction finding is to be applied by changing a wavelength of the control beam.

13. The microwave direction finder of claim 9, wherein the analysis system determines an intensity of the microwave wavefront based on the probe transmission pattern.

14. The microwave direction finder of claim 9, wherein the microwave lens system includes a plurality of microwave lenses.

15. A microwave direction-finding process comprising:
directing a probe laser beam through molecules contained in a cell to cause molecules to transition from a first state to a second state;
directing a control laser beam through the molecules to cause molecules to transition from the second state to a laser-induced third state;
using a microwave lens system, converting a microwave wavefront into a microwave interference pattern at the cell, a position of the microwave interference pattern at the cell being based on a propagation direction of the microwave wavefront, the microwave interference pattern inducing a probe transmission pattern in the probe laser beam; and
determining a propagation direction of the microwave wavefront based on a probe transmission pattern in the probe laser beam.

16. The microwave direction-finding process of claim 15, wherein the determining includes determining an intensity of the microwave wavefront based on the probe transmission pattern.

17. The microwave direction-finding process of claim 15, wherein the determining includes:
determines the propagation direction based on a position of the probe transmission pattern in the cell.

18. The microwave direction-finding process of claim 15, further comprising changing a microwave frequency to which direction finding is to be applied by changing a wavelength of the control laser beam.

19. The microwave direction-finding process of claim 15, wherein the microwave lens system includes a plurality of microwave lenses.

20. The microwave direction-finding process of claim 19, wherein the microwave lenses have respective optical axes that are parallel to each other.

* * * * *